UNITED STATES PATENT OFFICE.

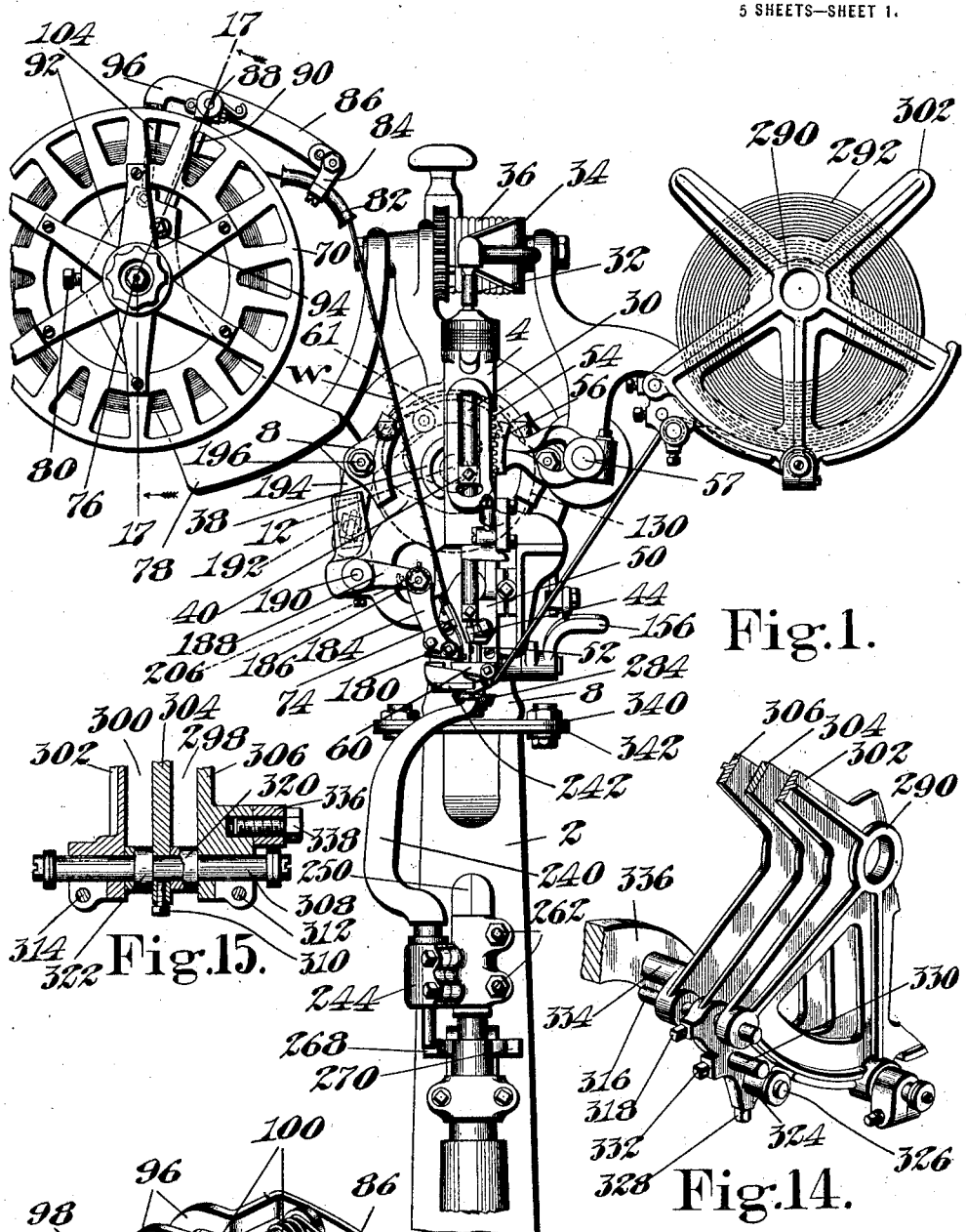

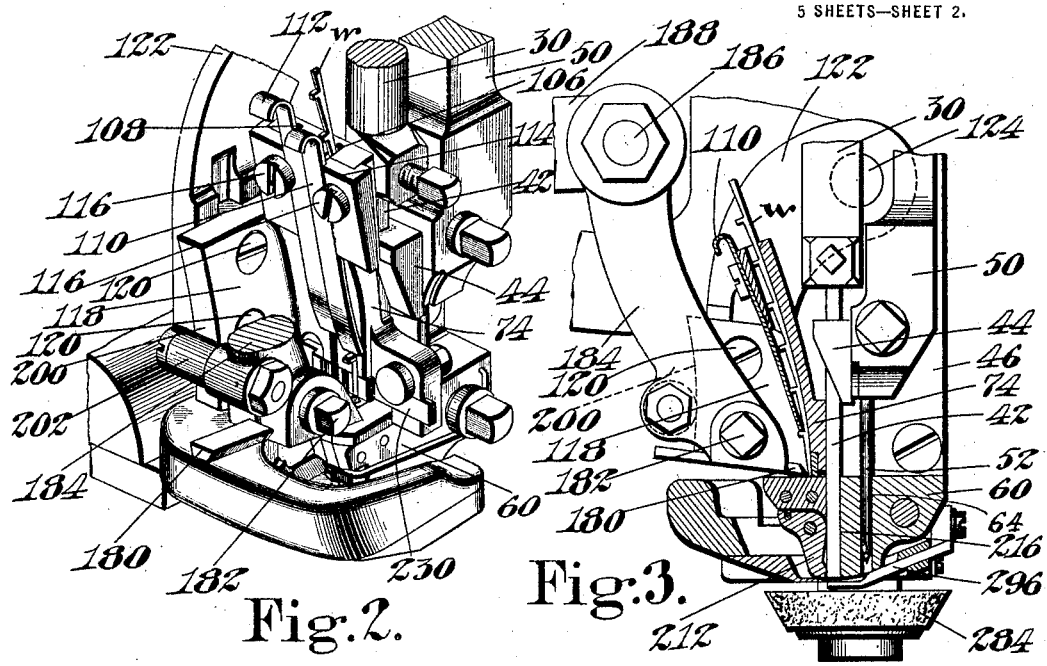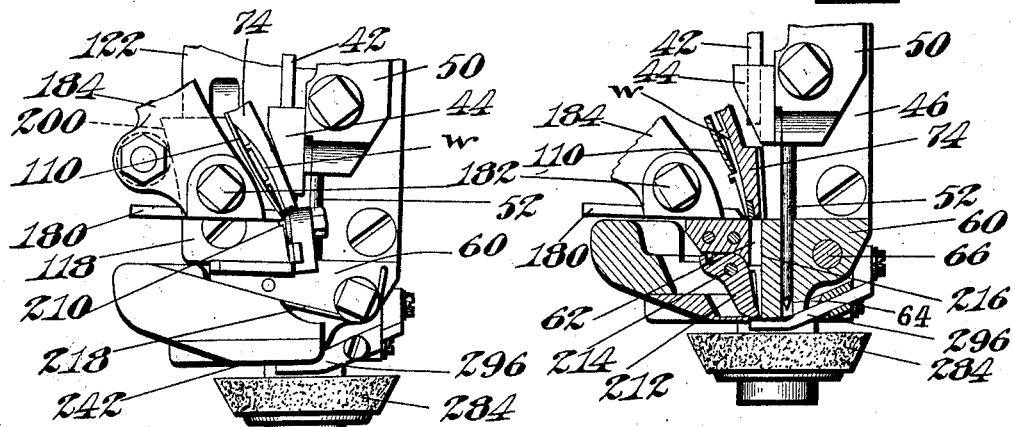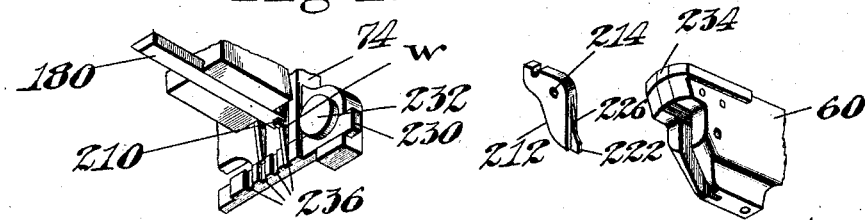

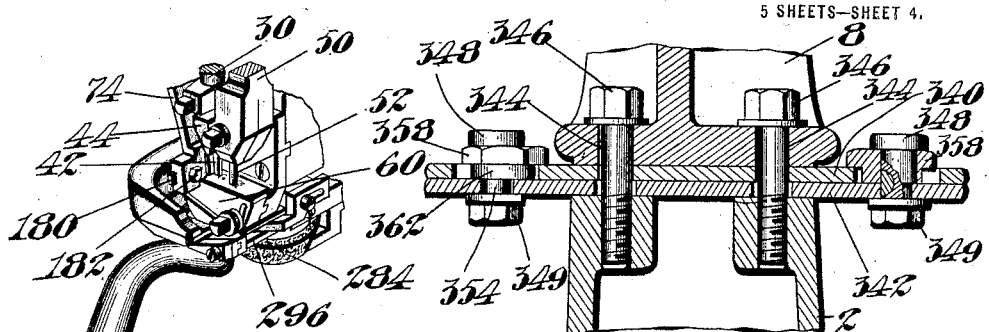
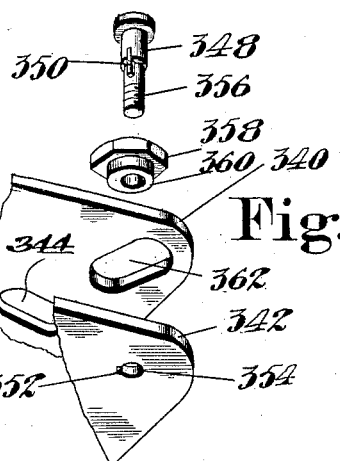
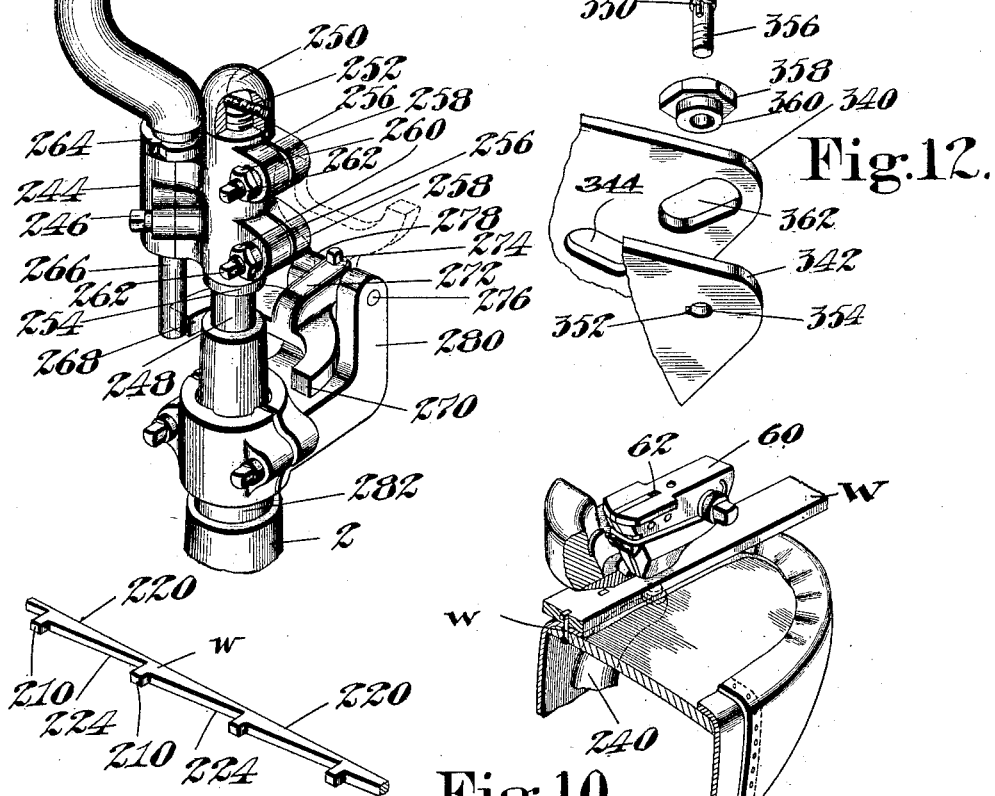

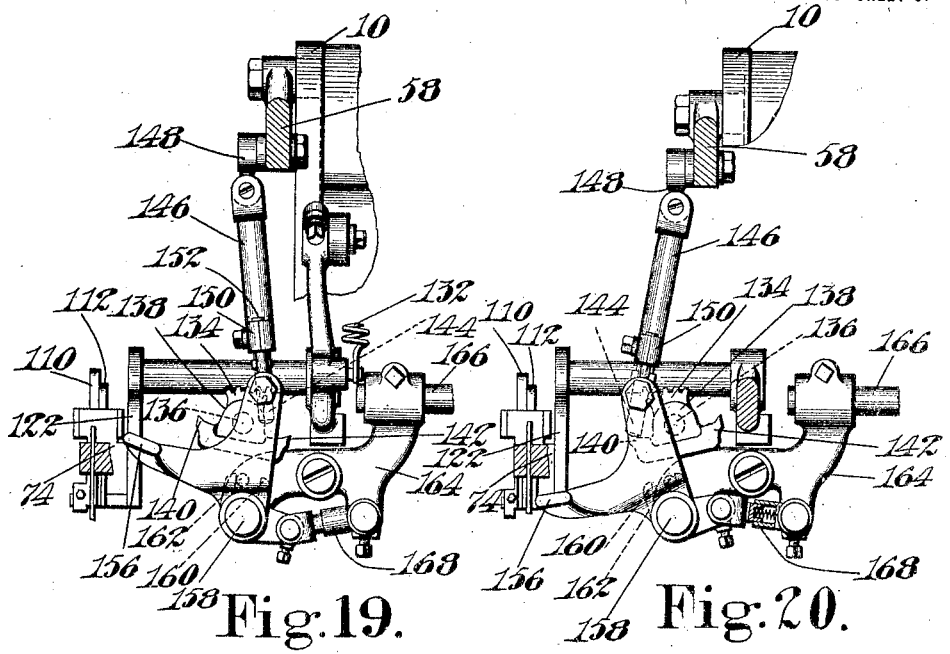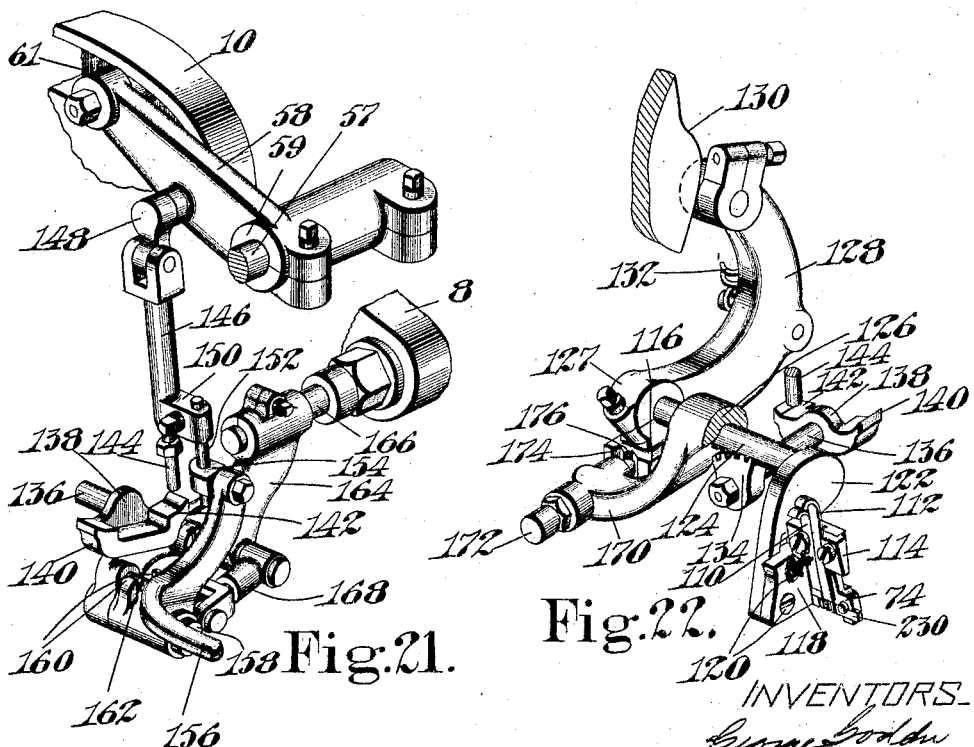

GEORGE GODDU, OF WINCHESTER, AND FRED L. MACKENZIE, OF BEVERLY, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY.

MACHINE FOR INSERTING FASTENINGS.

1,401,247.     Specification of Letters Patent.     Patented Dec. 27, 1921.

Application filed December 18, 1916. Serial No. 137,571.

*To all whom it may concern:*

Be it known that we, GEORGE GODDU and FRED L. MACKENZIE, citizens of the United States, residing at Winchester, in the county of Middlesex, and Beverly, in the county of Essex, respectively, and State of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings in boots and shoes. For the purpose of illustration the invention is herein shown and described as embodied in a machine of the type set forth in United States application, Ser. No. 137,152, filed Dec. 15, 1916, in the name of Fred L. Mackenzie.

Machines of this type, commonly known as string nailing machines, are organized to feed the nails of a nail string successively into fastening inserting position and to sever the nails from the string one by one, the nails being inserted in openings previously formed in the work by an awl which serves also to feed the work between successive fastening inserting operations. The general object of the present invention is to provide a string nailing machine of this type which will have all the advantages characteristic of the machine of said co-pending application and will, in certain respects, be superior to that machine.

In the use of the machine of said co-pending application, the nails are fed into fastening inserting position by a feed member operating upon a further forward movement transversely to the line of nails to sever the successive nails from the nail string, the direction of the nail severing movement being toward the back or straight side of the nail to be severed.

The present invention provides an improved nail shearing or cutting mechanism which, in its preferred form, effects the nail severing operation by shearing the point of the second nail in the string across and against the projecting portion of the head of the first nail in the string. In the illustrated embodiment of the invention the nail severing means is carried by a nail guiding member which has a forward movement into alinement with the nail receiving throat and a return movement out of alinement with the throat, and the nail severing operation is effected during this return movement of the guiding member.

The invention also is directed to the provision of improved string nail wire supplying means designed to insure the uniform feeding of the wire from the reel without danger of tangling, kinking or breaking the wire. In accordance with this feature of the invention, the illustrated wire supplying parts include novel wire reel braking means so constructed and arranged that the pull exerted by feeding movement of the wire will immediately and invariably release the brake, but operating uniformly to check the unwinding of the wire the instant pull or tension on the wire ceases.

Other features of the illustrated machine reside in novel means for conveniently and accurately adjusting the head of the machine on the machine column and positively locking the head in adjusted position.

These and other novel features of the construction and operation of the illustrated machine will be apparent from the following detailed description thereof and are defined in the appended claims. Referring now to the accompanying drawings, Figure 1 is a front elevation showing so much of the machine as is pertinent to this case;

Fig. 2 is an angular view of the operating instrumentalities of the machine;

Figs. 3, 4, 5 and 6 are views in front elevation, Figs. 3, 5 and 6 being also partly in section, showing the operating instrumentalities at different stages in the cycle of operations of the machine;

Fig. 7 is an angular view showing the lower side of the nail feeder and the lower end of the nail string guide;

Fig. 8 is an exploded view showing, in perspective, the throat and the nail controlling finger which is associated with the throat;

Fig. 9 is an angular view showing the horn or work support and its relation to the operating instrumentalities of the machine;

Fig. 10 is an angular view showing a shoe in operative relationship to the machine for nailing a welt on the shoe;

Fig. 11 is a vertical sectional view showing in detail the means for adjusting and locking the head of the machine on the machine post or column;

Fig. 12 is an exploded view showing, in perspective, the head adjusting means;

Fig. 13 is an angular view of part of a nail string;

Fig. 14 is an angular view showing the construction of the multiple welt reel with which the machine is equipped;

Fig. 15 is a cross sectional view of a part of said welt reel;

Fig. 16 is an angular view of the wire reel tension device;

Fig. 17 is a cross sectional view of the wire reels taken on the line 17—17 Fig. 1;

Figs. 19 and 20 are views in side elevation showing, in different positions, the mechanism for shifting the nail string or wire guide; and Figs. 21 and 22 are angular views showing the wire guide shifting and operating mechanism.

For convenience in reading the following detailed description of the illustrated machine, its general organization may be briefly outlined as follows: The machine includes a swinging head carrying a nail throat, a nail driver mounted for reciprocating movement through the nail passage formed in said throat, and an awl also mounted on the head and arranged to reciprocate therein to penetrate the shoe to form a nail receiving opening and then to feed the shoe laterally into a position to bring the opening so formed into the line of drive so that the next fastening will be inserted in this opening. A string nail feeding mechanism is arranged to advance successive nail lengths of string nail wire into the throat and a cutting mechanism severs the endmost nail lengths, one at a time, as they are so positioned, thus locating the severed nail in the path of the driver which descends and drives the nail into the work.

Figure 18:
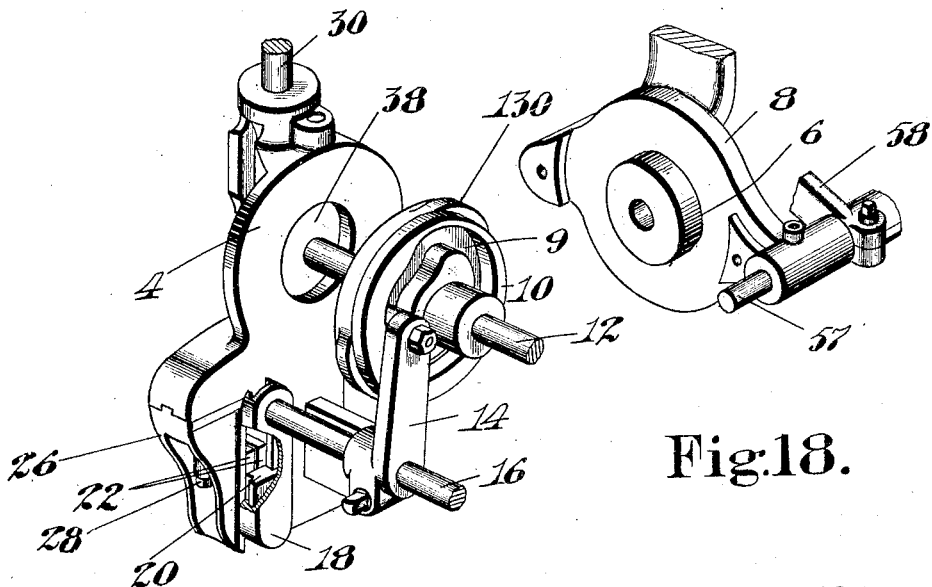
Fig. 18 is an angular view showing the means for supporting and operating the swinging head.

Referring to the drawings, the illustrated machine has a standard or column 2 (Fig. 1), a main frame or stationary head 8, and an auxiliary swinging head indicated at 4. In the head 4, as hereinbefore stated, are mounted the various parts of the fastening inserting and awl mechanisms as well as the wire feeding and severing means. This auxiliary machine head 4 is mounted to swing or rock about the usual pivot projection 6 on the main frame or head 8 of the machine (Fig. 18), the head 4 being oscillated about its pivot 6 by operative connections therefrom to a cam groove 9 in a cam 10 on the main shaft 12. These connections comprise an arm 14 carrying at its upper end a roller entering the said cam groove in the cam 10, a rock shaft 16 by which the arm 14 is carried, and a feed arm 18 carried at the front end of the rock shaft 16 and grooved to receive the foot of a hollow stud 20 fitted to slide in the groove in the feed arm 18. The stud 20 has screwed into and through it a stud screw, the inner end of which screw engages the arm 18. The stud 20 is embraced loosely, back of the screw head, by two blocks 22, 22, having opposite flat faces which enter a slideway formed between a part of the rocking head 4 and a bracket 26 that is adjustably connected to the rocking head 4 by a tongue and groove connection and is held in adjusted position by a set screw 28.

The driver bar 30 is mounted in a guideway in the swinging head 4 (Fig. 1). The upper end of the driver bar is connected by a ball joint to a link 32 which is similarly connected to a lever 34 actuated, when permitted, by a tension spring 36 to force the driver bar downwardly, the driver bar 30 being lifted against the tension of the spring 36 by a driving cam, indicated at 38, carried at the front end of the main driving shaft 12 and operated in the rotation of said shaft to engage a block 40 projecting from the driver bar 30. The driving shaft 12 is driven from a loose pulley (not shown) which may be clutched to a fixed pulley on the said shaft 12 at the will of the operator by suitable mechanism. The driver 42 is clamped in the lower end of the driver bar 30 (Figs. 2 and 3) and slides through a driver guide 44 integral with a plate 46 screwed to the swinging head 4.

For penetrating a shoe to form fastening receiving openings in it and moving the shoe laterally to impart feeding movements between successive fastening insertions, the head 4 carries, mounted for reciprocation therein, an awl bar 50 having an awl 52 clamped in its lower end. For reciprocating the awl bar 50 to cause the awl 52 to penetrate the work and subsequently, after the work feeding movement, to be raised and withdrawn from the work, the awl bar 50 is provided with teeth 54 (Fig. 1) arranged to engage the teeth of a toothed segment 56 carried at the outer end of a rock shaft 57 having fixed thereon a lever 58 (Figs. 1 and 21) fulcrumed at 59 and provided at its inner end with a roll which runs in a cam groove 61 in the cam 10 (Fig. 21).

The illustrated machine, like the machine of said application, is also provided with a nail throat 60 having therein a nail passage 62 (Fig. 6) into which the nails are successively fed and through which the driver 42 operates and an awl passage 64 through which the awl 52 operates, the throat 60 being secured to the plate 46 by a screw indicated at 66.

As above indicated, the machine of the drawings is adapted to insert headed fastenings of the type commonly known as string nails, the fastenings being cut successively from a nail string after the nail lengths have been successively fed downwardly into the nail passage 62 in the throat 60.

The illustrated machine is shown equipped to handle two nail strings $w$, the nail string coils being carried by reels 70, 72 (Figs. 1, 16 and 17), and the end portions of both strings being guided in a nail string wire guide 74. As shown, the wire reels 70 and 72 are carried on a shaft 76 (Fig. 1) journaled in a bracket 78 fixed to the main or stationary head 8 of the machine, the shaft 76 being secured in bearings in the bracket 78 by a clamping screw 80. Each wire string $w$ is led from its reel through a tubular guide 82 flared at its ends to facilitate the passing of the heads of the nails of the string therethrough and adjustably clamped in a block 84 (Fig. 16) which is pivoted on the outer end of a lever 86 fulcrumed on a pin 88 that passes through an upright post 90 (Fig. 17) slidably received in an upward extension 92 of the bracket 78 and held in adjusted position by a set screw 94. The flaring of the ends of the guide 82 provides surfaces converging toward the nail string at the end of the guide through which the nail string enters and diverging from the nail string at the end through which the nail string leaves to facilitate the passing of the heads of the nails through the guide. Each lever 86 has a rearward extending arm 96 which carries a brake shoe or facing indicated at 98 (Fig. 16). A spring 100 acts on each lever 86 to press the brake member 98 yieldingly against the periphery of the reel, and the tension of this spring 100 may be regulated by adjusting the clamping collar 102 on the rod 88 since one end of the spring bears against this collar. The tension of this spring is so adjusted that the pull exerted on the free end of one of the wire strings by the wire feeding mechanism is sufficient to depress the outer end of the corresponding lever 86 thus lifting the rear end of the lever and freeing the brake from the reel. Conversely, as soon as the pull upon the wire ceases, the rear end of the lever 86 is pressed against the periphery of the inner wall of its respective reel, exerting an immediate braking action upon the reel and preventing further rotation of the reel. The reel with a coil of nail string thereon is comparatively heavy and its inertia is correspondingly great. Spring 100 need be only comparatively light in order to cause the brake shoe 98 to exert a sufficient braking force upon the reel, and lever arm 86 is several times the length of lever arms 96. Accordingly when the feeder 180 is operated to feed the nail string the length of a nail, the necessary length of nail string necessary to permit the feed is taken from the bight of the nail string between the reel and the feeder, the bight being thus somewhat flattened and the lever rocked to release the brake. The inertia of the reel with the coil of nail string thereon is great enough to prevent substantial movement of the reel during the very short interval of time, some two or three hundredths of a second, which elapses during the feeding movement of the feeder. At the completion of the feeding movement of the nail string the latter is held against retrograde movement by the retainer 110 (hereinafter described) and, the brake being now in released position, the reel is free to rotate and does rotate as spring 100 moves lever 86 back to its former position. Thus the spring 100 is utilized to store energy supplied to it at the time of the feeding movement of the nail string and to expend this energy between successive feeding movements to cause the reel to rotate through the small angle necessary to permit the flattened bight of the nail string to resume its normal form. Thus the reel is effectively braked between the different steps of its movement and over-running is prevented, and at the same time only a comparatively light tension is at any time applied to the nail string with the results that the machine may be run at comparatively high speed and that a nail string the nails of which are formed with comparatively fine points and accordingly having a comparatively low tensile strength may be used without danger of breakage. Such a nail string is advantageous in that the nails cut therefrom may be more easily and more satisfactorily driven than nails with coarser points.

To prevent the rear ends of the arms 86 from dropping out of position whenever one or both of the wire reels is removed, an upright adjustable rod 104 is provided, the upper end of the rod 104 being just below the peripheries of the adjacent inner walls of the wire reels and alined for engagement with the brake faces on the rear ends of the arms 86 whenever one or both of the wire reels is removed.

The wire guide 74, as illustrated, has two nail passages or grooves 106, 108 (Fig. 2) to receive the two nail strings $w$ and is shiftable from one to the other of two positions with relation to the throat nail passage 62 to enable the guide to direct either nail string $w$ into the throat 60.

The nail passages 106, 108 (Fig. 2) are partially covered respectively by retaining springs 110, 112, which are held in position by a cap 114 and screws 116, the lower ends of the retaining springs 110 and 112 projecting downwardly below the lower edges of the cap 114 and bearing yieldingly against the nail strings in the nail guide passages 106 and 108. These springs are so adjusted that their lower ends overlie the respective nail grooves just above the head of the nail next to be advanced in that groove. They thus perform the function of pawls coöperating with the heads of the nails in the string to prevent the nails from being dragged upwardly upon the upward movement of the nail feeder.

In order to give the wire guide 74 its operative movement, it has an integral plate 118 (Figs. 2 and 3) screwed at 120 to an arm 122 (Figs. 3 and 22) fast on a rock shaft 124 that is journaled in a casting 126 (Fig. 22) on the swinging head 4. The rock shaft 124 has secured thereto by a split clamp 127 a lever 128 operated by a face cam 130 on the cam block 10, a spring 132 keeping the cam roll on the upper end of the lever 128 against the cam 130. Upon rocking movement of the shaft 124, the wire guide 74 is swung into and out of the line of drive.

For shifting the wire guide 74 in and out to enable it to direct one or the other nail string $w$ as desired into the throat, the rock shaft 124 is mounted for bodily lengthwise movement, this movement of the shaft 124 being effected by means of a segment 134 (Figs. 19, 20 and 22) engaging a rack on the lower side of the rock shaft 124. The segment 134 is secured to a rock shaft 136 carried in a bearing in the swinging head 4 and having at its other end a shifter 138 provided with two arms 140, 142 in which are seats adapted to be engaged alternatively by a plunger 144. The plunger 144 is adjustably carried in a sleeve 146 which is connected by a link 148 to the awl bar lever 58. Upon every movement of the awl bar lever 58 to lower the awl bar 50 and awl 52, the shifting plunger 144 will be lowered and, upon return movement of the awl and awl bar lever, the said plunger will be correspondingly raised. Whenever one of the arms 140, 142 of the shifter 138 is elevated into the path of the plunger 144, the next downward movement of that member depresses said arm and rocks the shifter 138 thereby acting through the segment 134 to slide the rock shaft 124 through its bearings and move the wire guide forward or backward.

For the purpose of swinging the plunger 144 into line with one or the other of the arms 140, 142 of the shifter 138, the link 146 carrying the plunger 144 has an offset split clamp arm 150 (Fig. 21) carrying an adjustable pin or stud 152 which passes loosely through a hole in a block 154 pivoted to one arm of a shift lever 156 fulcrumed at 158 and having its free end shaped to form a finger piece. The lever 156 is provided with two stops 160 adapted to engage a pin 162 on a bracket 164 clamped on a stud 166 fixed to the main head 8 to limit movement of the shift lever 156 in one or the other direction. Upon movement of the shift lever 156, through the described connections the plunger 144 is brought in line with one or the other of the seats in the arms 140 and 142 of the shifter 138 so that, upon the next downward movement of the awl bar 50, that arm of the shifter 138 will be engaged by the plunger 144 and depressed, thereby shifting the wire guide 74 in one direction or the other. Thereafter, so long as the position of the shift lever 156 remains unchanged, the plunger 144 will reciprocate idly, but if the shift lever 156 is moved in the opposite direction, thereby swinging the plunger 144 into line with the other arm of the shifter 138, this arm being now raised, upon the next succeeding downward movement of the plunger 144, that arm of the shifter 138 will be depressed and the wire guide 74 thereby oppositely shifted.

The described wire guide shifting mechanism not only provides for automatically shifting the wire guide to bring either nail string into feeding position upon setting the shifter 138 by means of the shift lever 156 but has the further advantage of insuring that the wire guide shift can only take place at a proper time in the cycle of operations of the machine. At the same time, the shift lever 156 may be manipulated either way at any time during the operation of the machine and without interrupting the operation of the machine, since the shift becomes effective only upon the next succeeding downward movement of the awl bar lever regardless of the time in the cycle when the shift lever is manipulated. A connecting link and spring plunger, indicated at 168 (Fig. 20) disposed between the bracket 164 and the shift lever 156, operate to prevent accidental displacement of the shift lever 156 from the position in which it is set by the operator through the jarring of the machine or otherwise. Similarly, the casting 126 has a depending arm 170 (Fig. 22) which carries a spring plunger indicated at 172 engaging one or the other of two notches 174 in a block 176 carried by the wire guide lever 128, the spring plunger 172 operating by engagement with one of the said notches to hold the rock shaft 124 from accidental lengthwise displacement and the consequent shifting of the wire guide 74.

For engaging the nail string $w$ from which nails are to be severed and driven, and successively feeding nail lengths into the throat 60, the machine is provided with a nail feeder 180 (Figs. 2, 3 and 7) adjustably secured by a clamping screw 182 to an arm 184 (Figs. 2 and 3) pivoted by a stud 186 (Fig. 3) to a rocker arm 188 fulcrumed at 190 (Fig. 1) on the auxiliary head 4. The rocker arm 188 has a block and slide connection 192 (Fig. 1) with a lever 194 fulcrumed on the main or stationary frame 8 of the machine at 196 (Fig. 1) and carrying a roll running in the cam path 61 in the cam block 10. A spring 206 coiled about the stud 186 tends to force the feeder 180 toward the wire guide 74, and a cam face 200 (Fig. 2) on the wire guide plate 118 operates, by engagement with a roll 202 carried by the feed arm 184, to limit the inward movement of the feeder 180 produced by the spring 206. The cam thus guides the feeder and controls its path of movement.

In the operation of the machine, the nail feeder 180 first engages the head 210 of a nail of the nail string $w$ (Fig. 4) and then, upon downward movement of the feeder arm 184, through its described cam operated connections, carries the nail string $w$ downwardly a distance sufficient to feed the nail which it engages into the nail passage 62 in the throat 60 with the head of the nail about flush with the top of the throat. Upon the return upward movement of the feeder arm 184 and feeder 180, the spring 206 yields to permit the feeder 180 to slide over and above the head of the second nail in the string into position to engage the head of that nail and subsequently to feed that nail into the nail throat 60.

Figures 5, 17:
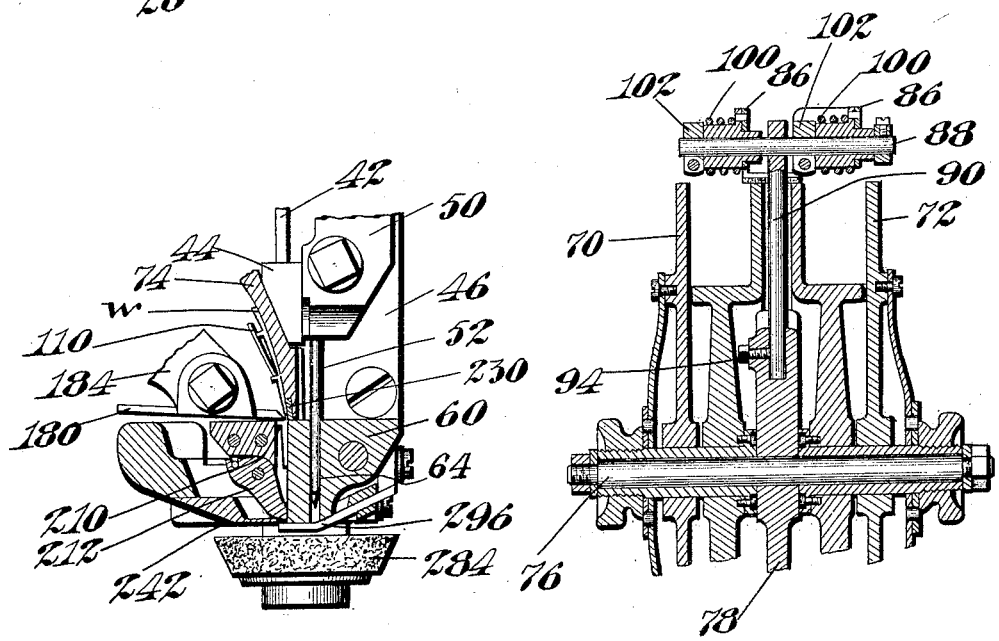

For the purpose of severing the successive nail lengths from the nail string $w$ after they have been fed into the nail passage in the throat, the wire guide 74 carries a knife or cutter 230 (see Figs. 2 and 7), this knife being adjustably clamped in the guide by a bolt 232. As stated in the foregoing description, the guide 74 is moved toward the right, from the position in which it appears in Fig. 3 into the position in which it appears in Fig. 5, in order to bring the wire guiding groove into alinement with the fastening receiving throat before the feeder 180 can force the endmost nail length into the throat. Fig. 5 shows the parts at the conclusion of the nail feeding operation. The guide 74 is next given its return movement, that is a movement toward the left, to carry it out of the path of the driver 42; and during the first part of this return movement the knife 230 severs the first nail in the string (which nail is now positioned in the throat) by moving the point of the second nail toward the left across the previously formed projecting head of the first nail. This operation will be entirely clear from an inspection of Fig. 5. The head of the first, or endmost nail, being positioned in the nail passage in the throat will be backed up by the left hand wall of the nail passage so that the cutter will, in fact, sever the nail by shearing the point of the second nail against the head of the first nail. Since the direction of the shearing movement is toward the side of the nail string at which the nail heads project, it is obvious that a clean cut will be made and the formation of any projecting fin, which might be made if the cut took place in the opposite direction will be avoided. This arrangement reduces to a minimum the wear on the parts that perform the cutting operation and enables the mechanism to operate satisfactorily even after the cutter has become relatively dull. At the same time a single cutter only is required in the cutting mechanism.

The feeder 180 serves during this shearing operation merely to position the endmost nail properly with relation to the throat and the knife 230. While the spring 206 holds the feeder point in contact with the front or left hand edge of the nail string, as these parts appear in Fig. 5, this spring also permits the feeder to yield, or to be moved toward the left, as the wire guide 74 pushes it backwardly in making its return movement. The cam which operates the feeder is designed to lift the feeder slightly just as the return or cutting stroke of the wire guide 74 is started and this lifting movement is of sufficient extent to allow the feeder 180 to yield freely as the wire guide 74 pushes it backward. If it were not for this arrangement the wire guide would crowd the feeder 180 hard against the upper surface of the throat 60 during the return movement of the guide.

It will be seen from an inspection of Fig. 2 that the wire guide plate 118 is clamped to the part 122 by screws 120, and that the plate has a tongue entering a vertical groove formed in the arm 122. The screws 120 project through short slots formed in the guide plate so that this construction permits the adjustment of the wire guide vertically toward and from the top of the throat 60. The lower edge of the cutter 230 projects slightly below the edge of the wire guide where it sweeps across the top of the throat passage, and the adjustment just described enables the operative to set the guide after grinding so as to compensate for the reduction in the width of the cutter produced by the grinding operation.

In order to guide the nails accurately as they are forced through the nail passage, the throat 60 is provided with a nail controlling finger 212 (Figs. 6 and 8) consisting of a bell crank lever pivoted at 214 to the nail throat 60 below the plate 234, Fig. 8, which forms one side of the nail passage 62 of the throat, the said finger 212 forming the lower part of that side of the nail passage and being constantly pressed toward the opposite or fixed back wall 216 of the nail passage by a spring 218 (Fig. 4). The finger thus exerts a constant pressure against the successive nails in the throat 60 maintaining the back or straight sides 220 of each nail (Fig. 13) constantly in engagement with the back or straight and stationary wall 216 of the throat 60. For this purpose, as shown in Fig. 8, the control finger 212 has a blade end 222 (Fig. 8) projecting through a slot in the throat 60 into the nail passage 62 in position to engage successively the front side 224 of the lower part of the shank of each nail to force the shanks of the nails against the wall 216 of the nail passage, the finger 212 yielding to permit the heads of the nails successively to pass below it. Further to control the nails as they pass successively through the nail passage 62 in the throat 60 to insure that the back 220 of each nail as it passes through the said nail passage 62 is held against the back wall 216 of the said nail passage, the blade end 222 of the nail control finger 212 has a slight swell 226 which operates by engagement with the head 210 of each nail to crowd the upper part of the nail against the back wall of the nail passage. This throat and finger construction thus holds the nail straight while the driver forces it into the work and maintains a guiding action on the nail until it has been driven into the work so far that the stock then will maintain the direction of drive of the nail while the driving operation is completed.

As shown in Fig. 7, the cutter 230 may conveniently be provided with, for example, four cutting surfaces 236 thus providing two extra cutting surfaces, the cutter 230 being adjusted by unlocking the clamping bolt 232 to bring either pair of cutting surfaces 236 into operative position.

In the use of the machine, the shoe is clamped between a horn 240, best shown in Fig. 9, and a fixed abutment 242 (Fig. 4), the illustrated horn being normally spring pressed upwardly into work clamping position and being depressed against the pressure of the usual horn spring by a treadle to permit placing a shoe thereon and removal of the shoe after the completion of the operations thereon, and being intermittently and automatically slightly depressed during the operation of the machine, all in the manner well understood by those skilled in this art.

The lower end of the horn 240 is clamped in a bracket or yoke 244 (Fig. 9) by a clamp screw 246. The bracket or yoke 244 is rotatably mounted on the horn shaft or part 248 between a cap nut 250 screw threaded on the upper end of the horn shaft 248 and held in adjusted position by a set screw 252 and a collar 254 fixed on the horn shaft 248. To insure that the horn bracket 244 will have a proper running fit on the shaft 248, this bracket is provided with two pairs of ears 256, 258 and a hollow adjusting screw 260 having a hexagonal head is threaded through each of the ears 256, the inner ends of these screws bearing against the inner faces of the ears 258 to regulate the clamping action of the two pairs of ears. The ears of each pair are locked in adjusted position by a clamping screw 262 which is threaded through the screws 260 and into the ear 258.

To provide for accurate centering of the horn 240 and at the same time to provide for setting the horn 240 to compensate in any position of rotation of the horn for the springing tendency of the horn tip, the lower end of the horn is received in a split eccentric sleeve 264 adjustably disposed within the horn bracket 244 and clamped in adjusted position by the clamping screw 246. The horn and operating instrumentalities of the machine are so adjusted with reference to each other that the horn rotates about an axis substantially coincident (although preferably not exactly so) with the line of drive of the fastenings. This axis of rotation also passes through substantially the center of the clenching cavity formed in the horn tip. It is desirable, in order to facilitate the clenching of the fastenings, to have the line of drive a little to one side of the center of the clenching cavity so that the points of the fastenings will be deflected toward the center of this cavity and they will all thus be clenched in the same direction. The peculiar shape of horn required in machines of this character renders it impracticable to make the horn stout enough to eliminate entirely the springing action caused by the shock produced by the blow of the driver. Any such springing action, of course, displaces the clenching cavity with reference to the line of drive. The usual adjustment is such that the line of drive is very slightly to the right, as the parts are seen in Fig. 1, of the axis of rotation of the horn and consequently of the center of the clenching cavity. The spring of the horn, however, when it is in the position in which it appears in Fig. 1, obviously tends to move the center of the cavity toward the line of drive and thus to neutralize the advantage sought to be gained by this adjustment. At the same time if the clenching cavity is adjusted farther to the left of the line of drive in order to compensate for the spring of the horn in this position, it may bring the line of drive too close to the edge of the clenching cavity when the horn is in a diametrically opposite position, since the spring of the horn in this position obviously tends to throw the center of the clenching cavity still farther away from the line of drive. It will thus be seen that a very fine adjustment of the horn tip is necessary with reference to its axis of rotation and the line of drive and the eccentric sleeve 264 and the parts coöperating therewith, as above described, enable an operative to make this adjustment satisfactorily.

To limit the turning movement of the horn, particularly when the machine is used for welt nailing in which use it is not desired to have the horn make a complete revolution, the lower end of the horn has threaded into it a stud 266 which projects below the horn bracket 244 into position to engage either end 268 or 270 of a stop consisting of a yoke 272 adjustably held by a clamping screw 274 on a cross pin 276 which passes through the upper ends of two arms 278, 280 of a bracket that is clamped to a projection 282 from the machine column 2. In the operative position of the yoke 272, as shown in full lines in Fig. 9, its ends 268 and 270 determine the limits of swinging movement of the horn 240. Upon loosening the clamping screw 274, the yoke 272 may be swung into inoperative position, as shown in dotted lines in Fig. 9, in which position of the yoke 272 unrestricted movement of the horn 240 is permitted, as desired, for instance, in nailing outsoles to insoles in the operation commonly termed "all around nailing."

The work support mechanism hereinbefore described is not claimed in this application, inasmuch as it constitutes the subject-matter of our application, Serial No. 294,479, filed May 3, 1919.

The illustrated machine is also shown as provided with a usual type of edge gage comprising an idler roll or wheel 284, shown as leather faced, against which the shoe is pressed as it is turned for the insertion of successive fastenings to locate and regulate the distance of the row of fastenings from the edge of the shoe. The horn tip, of course, is inside the shoe while the fastening inserting operation is being performed, and if the horn were allowed an unlimited range of rotative movement about the axis of the horn post, it might pinch the upper stock so hard against the gaging means as to injure the stock and impair the salability of the shoe. The stop construction just described avoids any possibility of damage due to this cause, and at the same time affords all the freedom of movement of the horn necessary in operating on work of this character.

To adapt the machine for nailing a welt $w$ to an insole, in accordance with one use of the machine, as illustrated in Fig. 10, the machine shown in the drawings is provided with a welt holder 290 (Figs. 1 and 14) adapted to receive one or more coils of welting 292. The free end of each coil of welting is led from the holder 290 to a welt guide 296 (Figs. 3 and 9) having a slot through which the welting is guided to the nailing point, the illustrated welt guide being disclosed and claimed in Patent No. 1,282,809, granted Oct. 29, 1918, on co-pending application, Serial No. 97,015, filed May 12, 1916, in the name of George Goddu.

The illustrated welt holder comprises three spiders, 302, 304 and 306, which form the walls of two compartments 298 and 300 adapted to receive coils of welting. These three spiders are secured together by a rod or pin 308 adjustably held in the center spider 304 by a set screw 310, the outer spiders 302 and 306 being adjustably clamped to the rod 308 by clamping screws 312 and 314. A guide pin 316 (Fig. 14) secured to the center spider by a set screw 318 and extending through holes in the outer spiders, prevents any lateral twisting of the spiders or any rotative movement of one spider relatively to the others about the rod 308. The end spider 306 is clamped by screws 338 directly to a bracket arm 336 which projects from the stationary machine head. To facilitate the unwinding of the welting from the coils, rolls 320 and 322 are mounted loosely on the rod 308. For this purpose also a grooved roll is provided at one side of each compartment so that the strip of welting as it is unwound may be guided over this roll, one of these rolls being indicated at 324 (Fig. 14) and being mounted on a stud 226 secured in an extension of the spider 304 by a set screw 328. A pin 330 secured in the spider 304 by a set screw 332 overlies the roll 324 and prevents the welting from slipping off it.

As above indicated it is necessary to be able to make an accurate relative adjustment of the operating instrumentalities of the machine which are carried by the head and the horn which is mounted on the base or column of the machine, this adjustment being necessary in order to bring the line of drive and the axis of rotation of the horn into the proper relationship to each other. For this purpose the illustrated machine is provided with novel head locking and adjusting means, best shown in Figs. 11 and 12, this means comprising two superposed horizontal plates 340 and 342 secured respectively to the head 8 and column 2 of the machine. The plates 340, 342 and the base flanges of the head 8 are slotted, as shown at 344, for the passage of the bolts 346 which secure the main head 8 to the column 2. The plates 340, 342 are provided with a pair of opposed adjustable locking devices, illustrated in detail in Fig. 12, each comprising a shouldered bolt 348 having a key 350 adapted to enter a keyway 352 in a hole 354 in the plate 342, the hole 354 being just large enough to receive the reduced and threaded lower end 356 of the locking bolt 348. The bolt 348 passes through an eccentric adjusting collar 358 which is rotatable on the upper part of the bolt and is received in an elongated oblique slot 362 formed in the upper plate 340. Upon turning the collar 358, the plate 340 and the head 8 of the machine, which is fast to said plate, are turned relatively to the plate 342 and the machine column 2, by reason of the engagement of the eccentric 360 with the walls of the slot 362. The plates 340 and 342 are locked in adjusted position by the locking bolts 348 and their nuts 349 and also by the bolts 346.

The detailed sequence of operation of the various parts of the mechanism above described is as follows: After the horn 240 has been lowered against the pressure of the horn spring by depressing the horn treadle (not shown), the shoe to be operated upon is placed on the horn and the horn is permitted to rise under the influence of its spring to press the work against the abutment 242. Upon starting the machine by depression of the clutch treadle (not shown) the awl 52 is immediately lowered to engage and penetrate the shoe to form a nail receiving opening therein, this movement being produced by the downward movement of the cam operated awl bar lever 58 and awl bar 50 through the segment 56 and the rack 54. At the conclusion of the downward work penetrating movement of the awl 52, the nail feeder 180 starts to rise upon upward movement of the feeder arm 184 effected by cam operated movement of the rocking arm 188 and, at just about the same time, the driver 42 starts to rise, the upward movement of the driver being effected by engagement of the driver cam 38 with the block 40 on the driver bar 30. Just after the driver 42 starts its upward movement, the automatic depressing movement of the horn 240 commences, the shoe being thereby released for shoe feeding movement. While the nail feeder 180 and the driver 42 are rising and before the driver 42 has risen sufficiently to clear the nail passage 62 in the throat 60, the wire guide 74 starts very slowly toward the right (Figs. 1 and 3), swinging movement of the wire guide 74 being effected by turning movement of the rock shaft 124 and consequent swinging movement of the arm 122 upon cam operated movement of the lever 128. Just as the nail feeder 180 completes its upward movement, at which time the horn drop has been completed and the work released sufficiently to permit lateral feeding movement thereof by the awl 52, the driver 42 having at this time risen sufficiently to clear the nail passage 62 in the throat 60, the wire guide 74 pauses in its movement toward the right and dwells while the driver 42 continues its upward movement. The head 4 next begins to swing laterally about its pivot 6, upon cam operated movement of the rock shaft 16 and head swinging arm 14, to effect shoe feeding movement. At the completion of this movement and as the driver 42 reaches its uppermost position, the wire guide 74 begins to move again toward the right and just before this movement of the wire guide 74 is completed, the driver 42 being in its uppermost position, the awl 52 begins to rise out of the work and the horn 240 begins to return to its work clamping position under the influence of the horn spring. Just before the awl 52 completes its upward movement into its normal position the nail feeder 180 starts its downward feeding movement from the position of Fig. 4 advancing the lowermost nail length of wire into the nail passage 62 in the throat 60 by engagement with the head 210 (Fig. 4) of the nail. When the nail feeder 180 has completed approximately three-quarters of its downward feeding movement the swinging head 4 starts its return movement, the nail feeder 180 continuing its descent and completing its nail feeding movement while the head is swinging to the right on its return movement. Just as the head 4 completes its return movement into its normal position bringing the throat nail passage 62 into line with the nail receiving hole just formed by the awl 52, the wire guide 74 starts on its return movement to the left, the cutter 230 shearing the nail which has just been fed into the throat 60 from the nail string and continuing to the left to its normal position clear of the driver passage 62 (Fig. 6), whereupon the driver 42 is forced quickly downward by its operating spring 36 driving the nail which has just been fed into the throat 62 into the nail receiving hole last made by the awl 52.

While we have herein shown and described the best embodiment of the invention of which we are aware, it is obvious that certain features of the invention may be embodied in forms differing in detail from the specific construction shown without departing from the spirit or scope of the invention. Some features of the general organization of the machine, the wire feeding mechanism and the shifting mechanism for the wire guide, which are shown and described in detail in this application are not claimed in this case, but are claimed in the co-pending application of Fred L. Mackenzie hereinbefore identified.

Having thus described our invention, what we claim as new and desire to secure by Letters Patent of the United States is:

1. In a string nailing machine, the combination with a fastening receiving device, of means for feeding into said device the end portion of a nail string in which the heads of the nails project from one side of the string, and a part coöperating with said device to sever the endmost nail from the string through a relative movement of said part and device acting to move the point of the second nail in the string toward the projecting portion of the head of the first nail in the string.

2. In a string nailing machine, the combination with a fastening receiving device, of means for feeding into said device the end portion of a nail string in which the heads of the nails project from one side of the string, and a part coöperating with said device to sever the endmost nail from the string by a movement relatively to said device in a direction toward the side of said string from which the nail heads project.

3. In a string nailing machine, string nail feeding and cutting mechanism constructed and organized to sever the endmost nail in the string from the second nail by shearing the point of the second nail against the projecting portion of the head of the first nail.

4. In a string nailing machine, string nail feeding and cutting mechanism constructed and organized to sever the endmost nail in the string from the second nail through a relative movement of parts engaging said nails and operative to force the point of the second nail across the previously formed portion of the head of the first nail.

5. A string nailing machine, having in combination, a throat, a driver movable through said throat, nail feeding and cutting mechanism constructed and organized to feed the first length of a nail string into said throat by engagement with the projecting head of a nail in the string, said mechanism including a nail guiding device, and means for relatively moving said throat and guiding device into and out of alinement, said throat and device coöperating during such relative movement to force the point of the second nail in the string across the projecting head of the first nail and thereby to sever the first nail from the string.

6. A string nailing machine, having in combination, a throat, a driver movable through said throat, and nail feeding and cutting mechanism constructed and organized to feed the first length of a nail string into said throat by engagement with the projecting head of a nail in the string, said mechanism including a nail guiding device movable into and out of alinement with said throat and coöperating with said throat to force the point of the second nail in the string across the projecting head of the first nail and thereby to sever the first nail from the string.

7. In a machine of the character described, the combination with fastening inserting mechanism including a device having a fastening receiving passage, of mechanism for feeding the end portion of a strip of fastening material into said passage and severing said end portion from the strip, said mechanism including a guiding member formed with an open-sided recess to receive the strip and a feeding member movable along the open side of the recess, said guiding member being mounted to have a forward movement into alinement with said passage and a return movement out of alinement with said passage, and being operative to sever said strip during a part of its return movement.

8. A string nailing machine, having in combination, a nail receiving throat, mechanism for feeding the end portion of a nail string into said throat, and severing said end portion from the nail string, said mechanism comprising a nail string guide formed with an open-sided recess to receive a nail string, a reciprocating feeder operable along said recess to feed the nail string through it by engagement with the head of a nail in the string, mechanism for moving said guide forward into alinement with said throat and backward out of alinement with the throat, and a shearing member carried by said guide and coöperating with said throat while making its backward movement to sever the endmost nail from the string.

9. In a machine of the character described, the combination with fastening inserting mechanism including a device having a fastening receiving passage, of mechanism for feeding the end portion of a fastening strip into said passage and severing said end portion from the strip, said mechanism including a guiding member mounted to have a forward movement into alinement with said passage and a return movement out of alinement with the passage, and being operative to sever the strip during a part of its return movement, and means carried by the guiding member for preventing retrograde movement of the strip.

10. In a machine of the class described, in combination, a driver for the fastenings, a fastening receiving member movable into and out of the line of drive of the fastenings, mechanism constructed and arranged to present to said fastening receiving member a fastening strip formed with projections constituting the heads of the fastenings when severed from the strip, said mechanism comprising means operable on one side of the strip to feed the strip and means operable on another side of the strip to sever the fastenings from the strip.

11. In a machine of the class described, in combination, a driver for inserting nails into shoe stock, means for feeding a nail string composed of nails joined heads to points, said means being constructed and arranged to engage the side of the nail string remote from the line of drive of the nails, and means functioning independently of the feeding means to sever the nails from the nail string substantially at the junctions of their heads and points.

12. In a machine of the class described, in combination, a driver for the fastenings, a fastening receiving member movable into and out of the line of drive, and mechanism constructed and arranged to present to said fastening receiving member a fastening strip formed with projections constituting the heads of the fastenings when severed from the strip, said mechanism comprising means for engaging the endmost fastening of the fastening strip to feed it into said fastening receiving member, and independent means for severing said fastening from the strip.

13. In a machine of the class described, in combination, a driver for the fastenings, a throat movable into and out of the line of drive of the fastenings, mechanism constructed and arranged to deliver into said throat the endmost fastening of a fastening strip formed with alternating projections and depressions constituting respectively the heads and shanks of the fastenings, said mechanism comprising feeding means for the strip constructed to engage the head of the endmost fastening of the strip and movable into substantial contact with the upper surface of the throat to feed said fastening completely into the passage of the throat, and means separate from the feeding means for severing the endmost fastening from the strip after it is delivered into said throat.

14. In a machine of the class described, in combination, a driver for the fastenings, a fastening receiving member movable into and out of the line of drive of the fastenings, means in substantial contact with the fastening receiving member for guiding a fastening strip to said fastening receiving member constructed and arranged to guide a strip formed with projections constituting the heads of the fastenings when severed from the strip, means movable below the upper surface of the guiding means for engaging the projections on the strip and feeding the same through said guiding means to said receiving member, and means separate from said engaging means and movable relatively to said fastening receiving member for severing the fastenings from the strip.

15. In a machine of the class described, in combination, a fastening receiving member having a passage to receive the endmost fastening of a fastening strip, a movable guide for the strip arranged to be alined with said passage and disposed in substantial contact with the fastening receiving member so as to conduct the endmost fastening of the fastening strip directly into said passage, means for moving the guide relatively to the fastening receiving member, means operable on the strip intermediate between the ends of the strip engaging surface of the guide for feeding said strip through said guide thereby to insert the endmost fastening of the strip into the passage of the fastening receiving member, and means separate from the feeding means for severing the endmost fastening from the strip.

16. In a machine of the class described, in combination, a driver for the fastenings, a throat movable into and out of the line of drive and having a passage to receive the fastenings, and mechanism constructed and arranged to deliver into the passage of said throat the endmost fastening of a fastening strip formed with alternating projections and depressions, said mechanism comprising a guide constructed to engage the endmost fastening of the strip during its movement into the throat passage and formed with a recess through which the strip is conducted to said throat, said recess being open at one side, feeding means for the strip operable along the open side of the guide and constructed to engage said projections in feeding the strip, and means separate from the feeding means for severing the endmost fastening from the strip after it is delivered into said throat.

17. In a machine of the class described, in combination, a driver for the fastenings, a fastening receiving member movable into and out of the line of drive, and mechanism constructed and arranged to present to said fastening receiving member a fastening strip formed with projections constituting the heads of the fastenings when severed from the strip, said mechanism comprising means for feeding the strip and means for severing the fastenings from the strip constructed to operate on the side of the strip opposite to that on which the feeding means operates.

18. In a string nailing machine, the combination with a nail receiving device, of a string nail feeding mechanism constructed and arranged to feed the end portion of a nail string into said device, said mechanism including a nail string guide movable relatively to said nail receiving device, a reciprocating feeder operative to advance the nail string through the guide by engagement with the head of a nail in the string, means for giving said feeder its operative stroke, and additional means movable with the nail string guide for guiding said feeder.

19. In a string nailing machine, the combination with a nail receiving device, of a string nail feeding mechanism constructed and arranged to feed the end portion of a nail string into said device, said mechanism including a nail string guide movable relatively to the nail receiving device, a reciprocating feeder operative to advance the nail string through said guide by engagement with the head of a nail in the string, a reciprocating member carrying said feeder, and a cam coöperating with said member to control the path of movement of said feeder.

20. In a string nailing machine, the combination with a driver for the nails and a nail receiving device movable into and out of the line of drive, of a string nail feeding mechanism constructed and arranged to feed the end portion of a nail string into said device, said mechanism including a nail string guide movable relatively to the nail receiving device and formed with an open-sided recess adapted to receive the nail string, a feeder operative along the open side of the recess to advance the nail string through the guide by engagement with the head of a nail in the string, means for moving the nail string guide to carry said guide into and out of alinement with the nail receiving device, and means associated with said feeder and said guide for controlling the movements of the feeder.

21. In a fastening inserting machine, a driver for the fastenings, a fastening receiving member having a passage to receive the fastenings and movable to carry said passage into and out of the line of drive of the fastenings, means for feeding the endmost fastening of a fastening strip into the passage while out of the line of drive, and means for severing the fastening from the strip when the passage is in the line of drive.

22. In a fastening inserting machine, a driver for the fastenings, a fastening receiving member having a passage to receive the fastenings and movable to carry said passage into and out of the line of drive of the fastenings, means for inserting the endmost fastening of a fastening strip into said passage when said passage is out of the line of drive, said means including a guide for the fastening strip movable with the fastening receiving member upon the return of said passage to the line of drive, and means for moving said guide relatively to said fastening receiving member when the passage is in the line of drive to sever the endmost fastening from the fastening strip.

23. A string nail inserting machine having, in combination, nail inserting means, a reel upon which a coil of nail string may be carried, feeding mechanism arranged to engage the heads of the nails of the string to feed the nails of the string successively to nail inserting position, a brake operative to engage the reel to restrain movement thereof, and an elongated tubular member flared at its ends to facilitate the passage of the heads of the nails of the string therethrough and operatively connected to the brake to move the brake away from the reel under the influence of tension applied to the nail string by the feeding mechanism.

24. A string nail inserting machine having, in combination, a reel arranged to carry a coil of nail string, a lever supported adjacent to said reel and provided at one end with a brake shoe arranged to engage the reel and at its other end with a guide through which the nail string passes, said guide converging toward the nail string at the end through which the nail string enters to facilitate the passage of the heads of the nails of the nail string therethrough, means tending to hold the brake shoe in contact with the reel, and a feeder arranged to engage the successive nails of the string to feed the nails toward work inserting position, said guide being out of alinement with the feeder and the point at which the nail string leaves the reel so as to rock said lever under the influence of tension applied to the nail string by the feeder to carry the brake out of contact with the reel.

25. A string nail inserting machine having, in combination, a reel upon which a coil of nail string may be carried, a feeder to feed the end of the nail string toward nail inserting position, a lever supported adjacent to said reel and provided at one end with a brake shoe arranged to engage the reel and at its other end with a guide through which the nail string passes, said guide being arranged out of alinement with the feeder and the point at which the nail string leaves the reel, a spring tending to hold the brake shoe in engagement with the reel, and a retainer adjacent to the feeder to restrain the nail string against retrograde movement, whereby tension applied to the nail string by the feeder may operate to rock the lever and thus to reduce the bight in the nail string between the reel and the feeder so that the reel may remain substantially stationary during the feeding movement of the nail string, said spring being operative to apply the brake and return the bight of the nail string to its normal position after each feeding movement and thus to rotate the reel through a small angle after each feeding movement.

26. In a string nail inserting machine, the combination with nail inserting mechanism, of means for presenting nails to the nail inserting mechanism comprising a reel upon which a coil of nail string may be carried, a brake normally operative to restrain the reel, and a guide member through which the nail string passes, said guide member converging toward the nail string at the end through which the nail string enters to facilitate the passage of the heads of the nails of the nail string therethrough, and operable by tension applied to the nail string to move the braking means out of operative relation to the reel.

27. A string nail inserting machine having, in combination, a reel arranged to carry a coil of nail string, a feeder arranged to engage the nail string and feed it toward nail inserting position, means to sever successive nails from the string and insert them in the work, a brake arranged to engage the reel to restrain movement thereof, and a guide member out of alinement with the feeder and the point at which the nail string leaves the reel and shaped to conform to the desired path of the nail string between the reel and the feeder and operatively connected to the brake to move the brake from the reel under the influence of tension applied to the nail string by the feeder.

28. A string nailing machine having, in combination, a reel arranged to carry a coil of nail string, a feeder for the nail string, a lever fulcrumed adjacent to said reel and provided at one end with a brake shoe arranged to engage the reel and at its other end with a guide through which the nail string passes on its way to the feeder, and a spring tending to hold the brake shoe in engagement with the reel, the moment of inertia of the reel and the coil of nail string thereon being great as compared to the force necessary to be exerted upon said guide to rock said lever about its fulcrum, and said guide being out of alinement with the feeder and the point at which the nail string leaves the reel so that tension applied to the nail string by the feeder in its feeding movement may reduce the bight in the nail string between the reel and the feeder while the reel remains substantially stationary.

29. A string nailing machine having, in combination, a reel arranged to carry a coil of nail string, a feeder for the nail string, a lever fulcrumed adjacent to said reel and provided at one end with a brake shoe arranged to engage the reel and at its other end with a guide through which the nail string passes on its way to the feeder, and means tending yieldingly to hold the brake shoe to the reel, the moment of inertia of the reel and the coil of nail string thereon being great as compared to the force necessary to be exerted upon said guide to rock said lever about its fulcrum, and said guide being positioned in a bight of the nail string between the feeder and the point at which the nail string leaves the reel so that tension applied to the nail string by the feeder in its feeding movement may reduce the bight in the nail string between the reel and the feeder while the reel remains substantially stationary.

30. In a machine of the character described, the combination of a column, a head mounted on said column, fastening inserting instrumentalities carried by said head, plates secured to the head and column respectively, means operable on said plates laterally of the head and column for moving the head to adjust it with reference to the column, and means for locking the head in its adjusted position on the column.

31. In a machine of the character described, the combination of a column, a head mounted on said column, fastening inserting instrumentalities carried by said head, superposed plates secured to the head and column respectively, eccentric means operable on said plates laterally of the head and column for adjusting said head relatively to said column, and means for locking the head in its adjusted position on the column.

32. In a machine of the character described, the combination with a column and a head mounted on said column, of two eccentric adjusting means on opposite sides of said head operative to adjust the head on the column, and means for locking the head in its adjusted position on the column.

33. In a machine of the character described, the combination with a column and a head mounted on said column, of two eccentric adjusting means located at the opposite side of said head and serving to adjust the head relatively to the column, each of said adjusting means consisting of an eccentric member rotatable about an axis fixed with reference to said column and having a connection with the head by which it moves the head, and means for locking said head in its adjusted position on the column.

34. In a machine of the character described, the combination with a column and a head mounted on said column, of two superposed plates secured respectively to said head and column, an adjusting means for said head, said means comprising a bolt projecting through said plates, an eccentric device rotatable about the axis of said bolt, one of said plates having a slot therein with the walls of which said eccentric device engages, and means for clamping said bolt and device in any position of adjustment with reference to said plates.

In testimony whereof we have signed our names to this specification.

GEORGE GODDU.
FRED L. MACKENZIE.